(12) United States Patent
Hasuo

(10) Patent No.: US 9,586,326 B2
(45) Date of Patent: Mar. 7, 2017

(54) ROBOT HAVING A LINE DISTRIBUTION BOARD

(71) Applicant: FANUC CORPORATION, Minamitsuru-Gun, Yamanashi (JP)

(72) Inventor: Takeshi Hasuo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/227,438

(22) Filed: Mar. 27, 2014

(65) Prior Publication Data

US 2014/0290415 A1  Oct. 2, 2014

(30) Foreign Application Priority Data

Mar. 29, 2013  (JP) ................................ 2013-074100

(51) Int. Cl.
  *B25J 18/00* (2006.01)
  *B25J 19/00* (2006.01)

(52) U.S. Cl.
  CPC ...... *B25J 19/0025* (2013.01); *Y10T 74/20311* (2015.01)

(58) Field of Classification Search
  CPC .... Y10T 4/20311; B25J 19/0025; B25J 18/00
  See application file for complete search history.

(56) References Cited

U.S. PATENT DOCUMENTS

| 4,767,257 A * | 8/1988 | Kato .......................... 414/744.5 |
| 4,873,511 A | 10/1989 | Tanaka |
| 5,512,726 A * | 4/1996 | Arantes et al. ............ 219/125.1 |
| 5,779,609 A | 7/1998 | Cullen |
| 6,288,512 B1 * | 9/2001 | Berninger et al. ......... 318/568.1 |
| 7,547,987 B2 * | 6/2009 | Torigoe et al. .............. 307/10.1 |
| 2005/0034552 A1 | 2/2005 | Back |
| 2015/0090063 A1 | 4/2015 | Lantermann |

FOREIGN PATENT DOCUMENTS

| DE | 3636462 | 5/1988 |
| DE | 10018773 | 10/2001 |
| DE | 102007009850 | 9/2008 |
| DE | 102011006322 | 10/2012 |
| DE | 102012207060 | 10/2013 |
| JP | 63272491 | 11/1988 |
| JP | 07124887 | 5/1995 |
| JP | 07266281 | 10/1995 |
| JP | 11504869 | 5/1999 |
| JP | A 2006-315124 | 11/2006 |
| JP | 2009226567 | 10/2009 |

* cited by examiner

*Primary Examiner* — David M Fenstermacher
(74) *Attorney, Agent, or Firm* — RatnerPrestia

(57) ABSTRACT

A robot includes a plurality of lines respectively having connecting portions, which are connected to an outer apparatus, at end portions, and at least one line distribution board to which the connecting portions of the plurality of lines are attached. The line distribution board includes a plurality of line distribution board elements, which can be separated from each other, and to which the connecting portion of at least one of the plurality of lines is attached.

3 Claims, 8 Drawing Sheets

ROBOT HAVING A LINE DISTRIBUTION BOARD

BACKGROUND OF THE INVENTION

1. Field of the Invention

The present invention relates to a robot having a line distribution board to which a plurality of lines connected to an outer apparatus are attached.

2. Description of the Related Art

An industrial robot is provided at its wrist portion with detachable outer apparatus, such as a welding gun and a hand for holding a workpiece, depending on its application. A plurality of lines, which are necessary according to the type of an end effector, for example, cables for supplying power or sending signals, or tubes for supplying cooling water or air used for driving, are arranged in the robot. In many cases, these lines are attached to a single line distribution board through connectors attached to end portions of the lines.

Japanese Patent JP-B-4349320 discloses a technique for facilitating a replacing process of a supplying unit and a wiring process, which is necessary for the replacing process, by selectively connecting an inner cable connected to the supplying unit for supplying power, air or gas, and an outer cable connected to outer apparatus with each other.

According to the configuration in which lines are attached to a single line distribution board, in the case where it is necessary to replace a line due to changes in usage or the like, the line distribution board itself has to be replaced. Therefore, even though some of the cables are not required to be replaced, all of the cables have to then be detached from the line distribution board. After completion of the replacing process, these cables are attached again to the line distribution board. Accordingly, due to the cable detaching process and the cable attaching process, which are not essential, the time necessary for the cable replacing process is increased and the cost is also increased.

According to Japanese Patent JP-B-4349320, a connector must be attached to each line beforehand, which results in increased cost. In addition, as the application of the robot is diversified, various types of outer apparatus are used with the robot, and cables used for such outer apparatus are manufactured according to various standards. Accordingly, in order to make it possible to use for various applications without replacing the lines such as cables, it is necessary to provide lines with great versatility. However, such lines are expensive, which results in increased cost.

Accordingly, there is a need for an industrial robot which facilitates replacement of lines, depending on the application.

SUMMARY OF THE INVENTION

According to a first aspect of the present disclosure, a robot comprising: a plurality of lines respectively having connecting portions, which are connected to an outer apparatus, at end portions; and at least one line distribution board to which the connecting portions of the plurality of lines are attached, the line distribution board including a plurality of line distribution board elements, which can be separated from each other, and to which the connecting portion of at least one line of the plurality of lines is attached, is provided.

According to a second aspect of the present disclosure, the robot according to the first aspect further comprises at least one second line which is different from the plurality of lines, wherein the line distribution board includes a holding portion capable of holding the second line at an intermediate portion of the second line.

According to a third aspect of the present disclosure, in the robot according to the second aspect, the second line includes a power line and a signal line connected to a servo motor for driving the robot.

According to a fourth aspect of the present disclosure, in the robot according to any one of the first to third aspects, the line distribution board has a housing shape formed from the plurality of line distribution board elements when attached to each other.

These and other objects, features and advantages of the present invention will be more apparent in light of the detailed description of exemplary embodiments thereof as depicted by the drawings.

DETAILED DESCRIPTION OF THE INVENTION

Referring to the accompanying drawings, embodiments of the present invention will be explained below. In the following drawings, in order to understand the present invention, constituent elements may be changed in size in relation to one another. The same or corresponding elements are designated with the same referential numeral.

Figure 1:
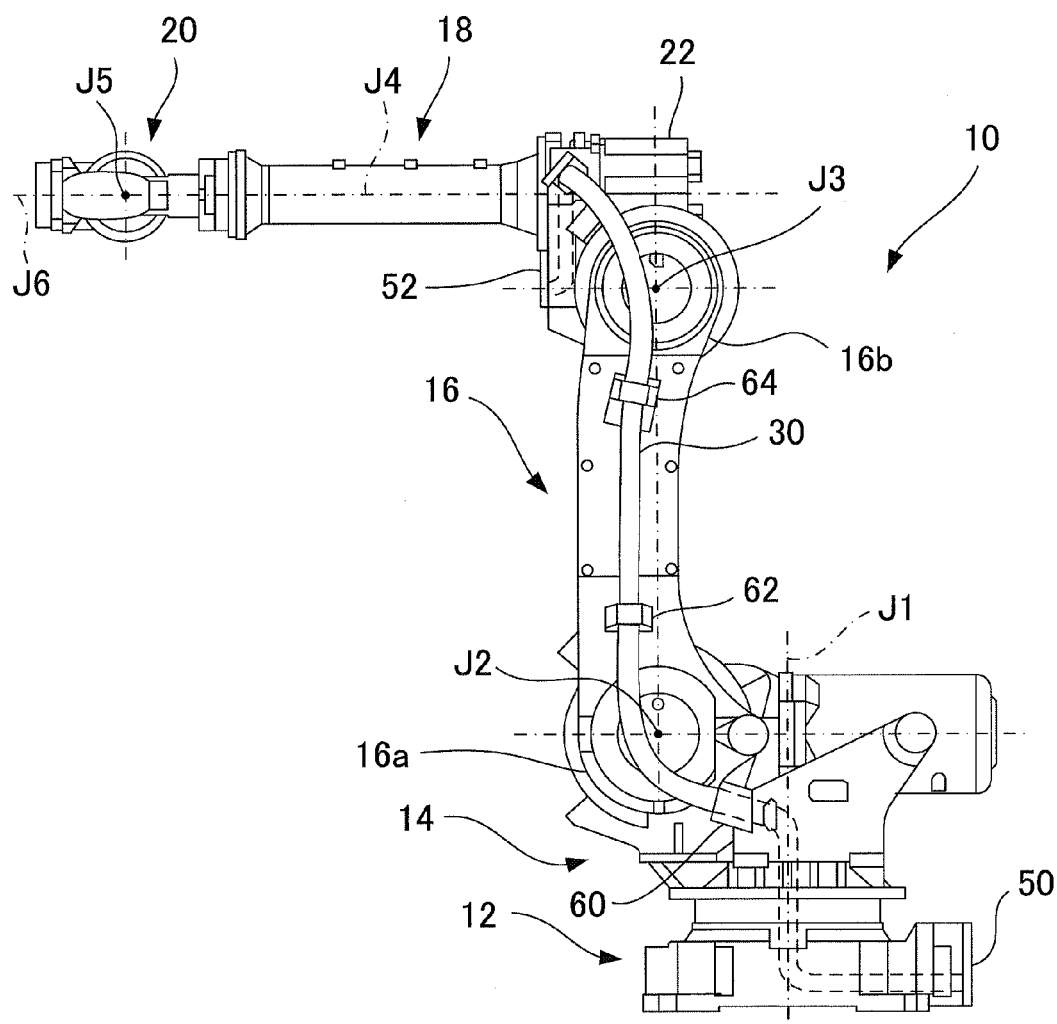
FIG. 1 is a side view of a robot of an embodiment of the present invention.

FIG. 1 is a side view of a robot 10 of an embodiment of the present invention. The robot 10 includes: a base 12; a turning portion 14 attached to the base 12 so that it can be turned; a lower arm 16 pivotably supported by the turning portion 14 at a base end 16a so that the lower arm 16 can pivot back and forth (to the right and left in FIG. 1); an upper arm 18 attached to a tip end portion 16b of the lower arm 16 arranged on the opposite side of the base end 16a; and a wrist portion 20 attached to a tip end of the upper arm 18. Dashed lines J1, J4, J6 and black dots J2, J3, J5 shown in FIG. 1 represent rotational axes of the robot 10. The robot, to which the present invention can be applied, is not limited to the specific type of robot shown in this specification by way of example, but may be any known type of robot.

Figure 2:
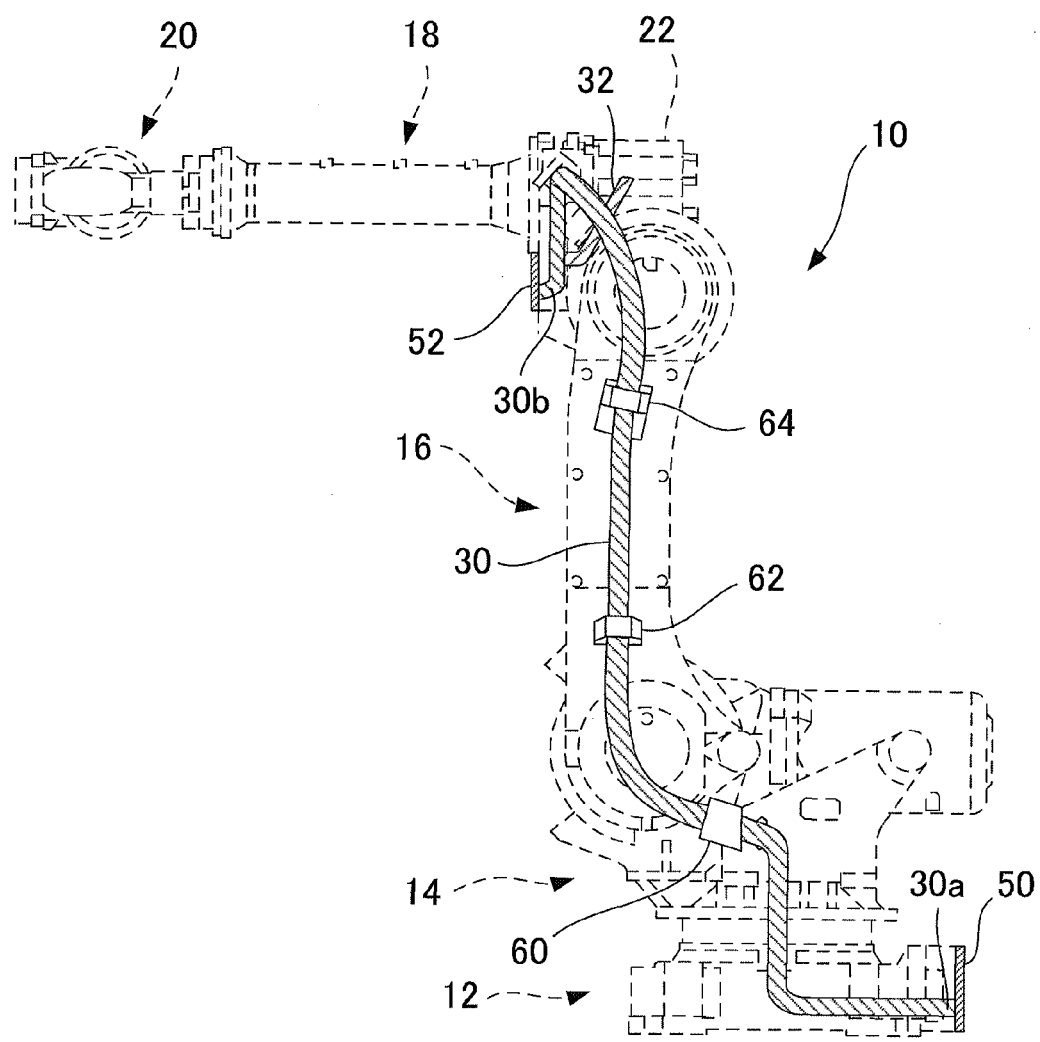
FIG. 2 is a side view of the robot showing lines arranged inside the robot shown in FIG. 1.

FIG. 2 is a side view of the robot 10 showing lines arranged inside the robot 10 shown in FIG. 10. In FIG. 2, only the following elements are shown by solid lines: a line bundle 30 shown with hatching; a first line distribution board 50 and a second line distribution board 52, to each of which at least one line in the line bundle 30 is attached; a branch line 32 branching from the line bundle 30 and connected to a servo motor 22 for driving the upper arm 18 and the wrist portion 20; and fixtures 60, 62 and 64 for fixing the line bundle 30. Other elements are shown by dashed lines. The first line distribution board 50 is attached to the base 12. The second line distribution board 52 is attached to the base end portion of the upper arm 18.

The line bundle 30 is a bundle of lines which include a plurality of cables or tubes prepared for various outer apparatus attached to the wrist portion 20 of the robot 10. For example, the line bundle 30 includes a first line (hereinafter referred to as "option cable") for establishing a supply path for supplying power, water, air or other gas to the outer apparatus attached to the wrist portion 20. The line bundle 30 also includes a second line including a cable for supplying power to a servo motor mounted on the drive shaft of the robot 10 (hereinafter referred to as "power cable"), and a cable for transmitting signals related to positional information of the servo motor (hereinafter referred to as "signal cable"). However, the line bundle 30 is not limited to this specific example. As shown in the drawing, the line bundle 30 is attached at its one end 30*a* to the first line distribution board 50 on the side of the base 12, and attached at the other end 30*b* to the second line distribution board 52 on the side of the upper arm 18.

Figure 3:
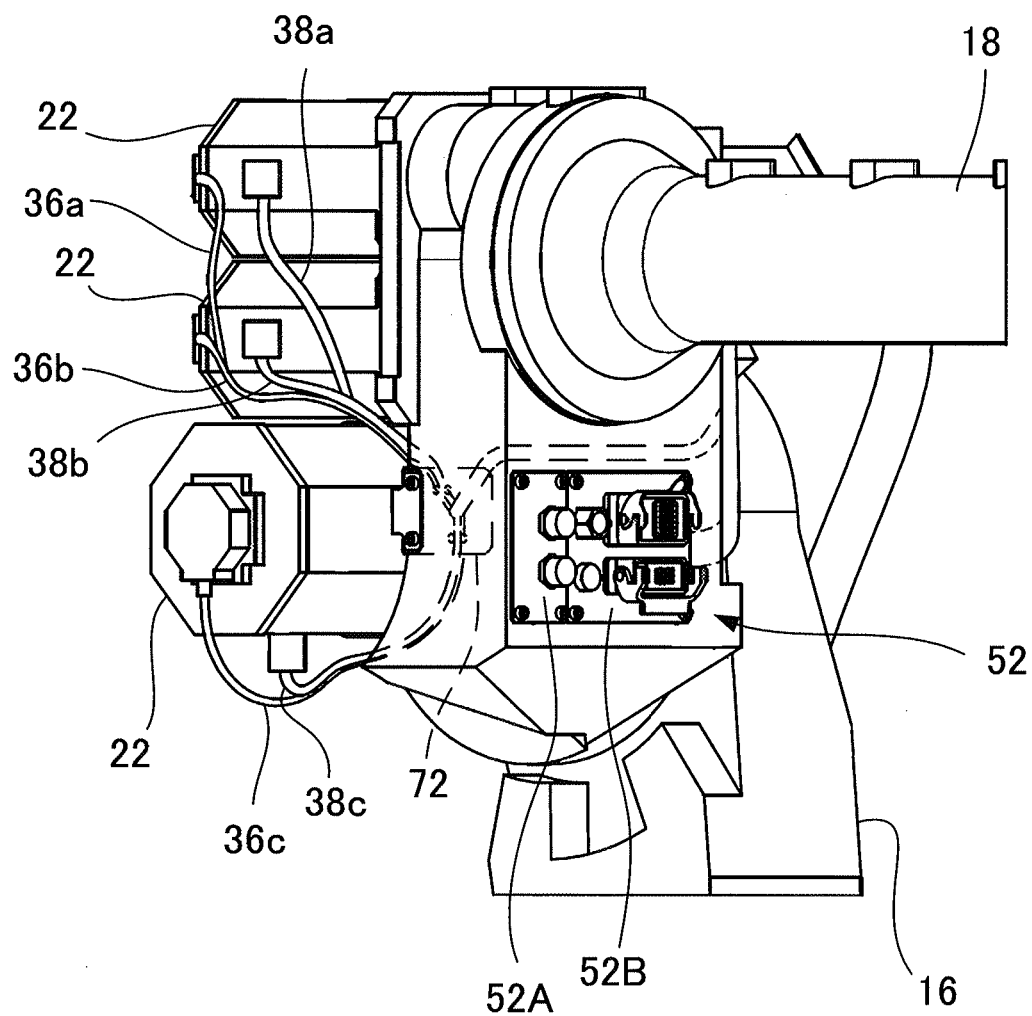
FIG. 3 is a partially enlarged perspective view showing a line distribution board of an embodiment of the present invention.

FIG. 3 is a partially enlarged perspective view showing a line distribution board of an embodiment of the present invention. By way of example, the second line distribution board 52, which is attached to the base end portion of the upper arm 18, and its periphery are shown in an enlarged view. The second line distribution board 52 is formed from a first line distribution board element 52A, and a second line distribution board element 52B. The first line distribution board element 52A and the second line distribution board element 52B are screwed to the main body of the robot 10, independently of each other. Although the second line distribution board 52 is explained by way of example, it should be noted that the first line distribution board 50 may have the same configuration as the second line distribution board 52.

Figure 4:
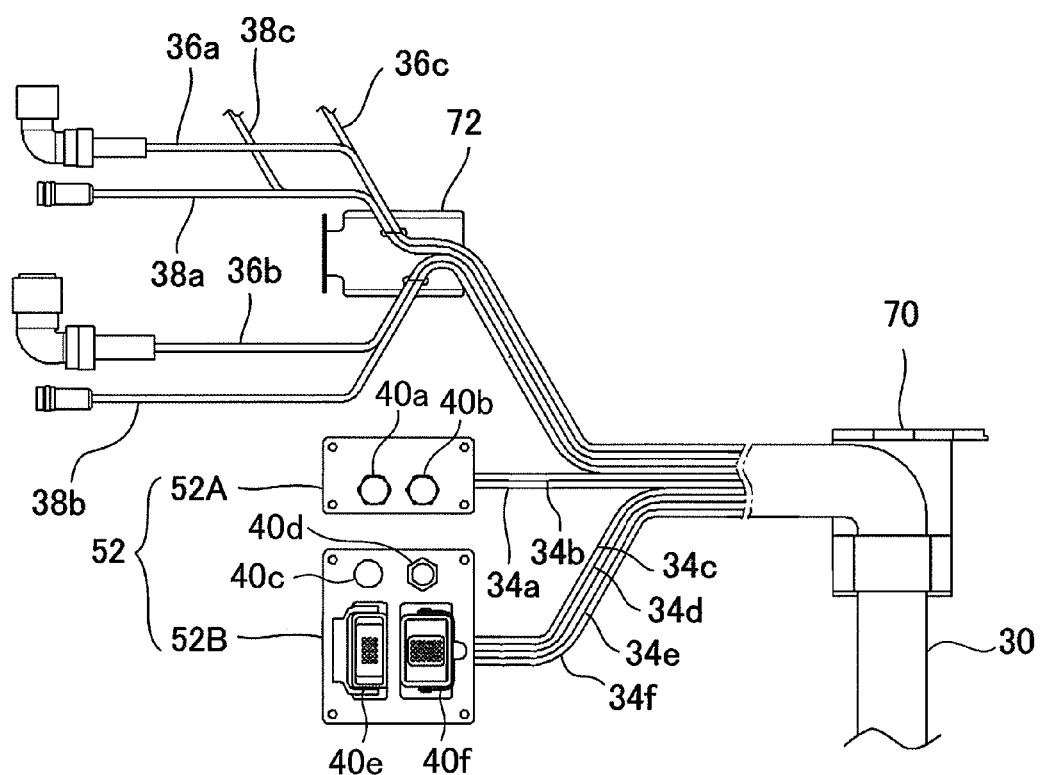
FIG. 4 shows an exemplary arrangement of the lines in the embodiment shown in FIG. 3.

FIG. 4 shows an exemplary arrangement of the line bundle 30 in the embodiment shown in FIG. 3. In the embodiment shown in the drawing, the line bundle 30 includes six option cables 34*a* to 34*f*, power cables 36*a* to 36*c* for supplying power to the servo motor 22 (see FIG. 3), and signal cables 38*a* to 38*c* for transmitting signals related to the positional information of the servo motor 22. The line bundle 30 is held by the first holding member 70. The power cables 36*a* to 36*c* and the signal cables 38*a* to 38*c* are held by the second holding member 72.

Two option cables 34*a* and 34*b* branch from the line bundle 30 at positions between the first holding member 70 and the second line distribution board 52. At end portions of the option cables 34*a*, 34*b*, circular connectors 40*a* and 40*b* are provided. The circular connectors 34*a* and 34*b* are screwed to the first line distribution board element 52A and connected to the connector on the side of the corresponding outer apparatus. The remaining four option cables 34*c* to 34*f* branch from the line bundle 30 in the same manner, but end portions of thereof are screwed to the second line distribution board element 52B through circular connectors 40*c* and 40*d* and rectangular connectors 40*e* and 40*f*. These connectors 40*c* to 40*f* are connected to the connectors on the side of the corresponding outer apparatus in the same manner. In this regard, the manner in which the respective connectors 40*a* to 40*f* are attached to the first line distribution board element 52A and the second line distribution board element 52B is not limited to a particular embodiment, as long as it provides sufficiently strong fixing at the time of operation of the robot 10, while they can be easily detached as necessary. Further, it may also be possible to provide a plug connector (not shown) at an end portion of the option cable and a relay adapter (not shown) of a panel attachment type on a line distribution board element. In this case, when the plug connector is fitted to the inside of the line distribution board at one end portion of the relay adapter, the option cable is attached to the line distribution board element. Outside the line distribution board, the outer apparatus is connected to the other end of the relay adapter.

The power cables 36*a* to 36*c* and the signal cables 38*a* to 38*c* extend between a first holding member 70 and a second holding member 72, separately from the option cables 34*a* to 34*f*. The power cables 36*a* to 36*c* and the signal cables 38*a* to 38*c* are held by the second holding member 72 in the intermediate portion. End portions of the power cables 36*a* to 36*c* and the signal cables 38*a* to 38*c* are respectively connected to the corresponding servo motors 22.

The first holding member 70 and the second holding member 72 may be configured to fix the cable by screwing with the cable being sandwiched between plate members facing each other, or by binding the cable with a band. However, they are not limited to any particular type of holding means.

The first line distribution board element 52A and the second line distribution board element 52B can be attached to and detached from the robot 10, independently of each other. Accordingly, for example, when the option cables 34*a* and 34*b* need be replaced, only the first line distribution board element 52A has to be detached from the robot 10, in order to replace the option cables 34*a* and 34*b*. During the replacement, the second line distribution board element 52B and the option cables 34*c* to 34*f* connected therewith remain attached to the robot 10. The power cables 36*a* to 36*c* and the signal cables 38*a* to 38*c* connected to the servo motor 22 are fixed to the robot 10 by means of the second holding member 72, which is provided separately from the line distribution board 52. Therefore, there is no need to detach these parts at the time of replacing the option cables. According to the present embodiment, in which the line distribution board is formed from a plurality of line distribution board elements which can be attached to and detached from the robot, independently of each other, only cables required to be replaced can be selectively detached to carry out the replacement. This facilitates the replacement process and reduces the time required therefor, resulting in reduced cost.

Figure 5:
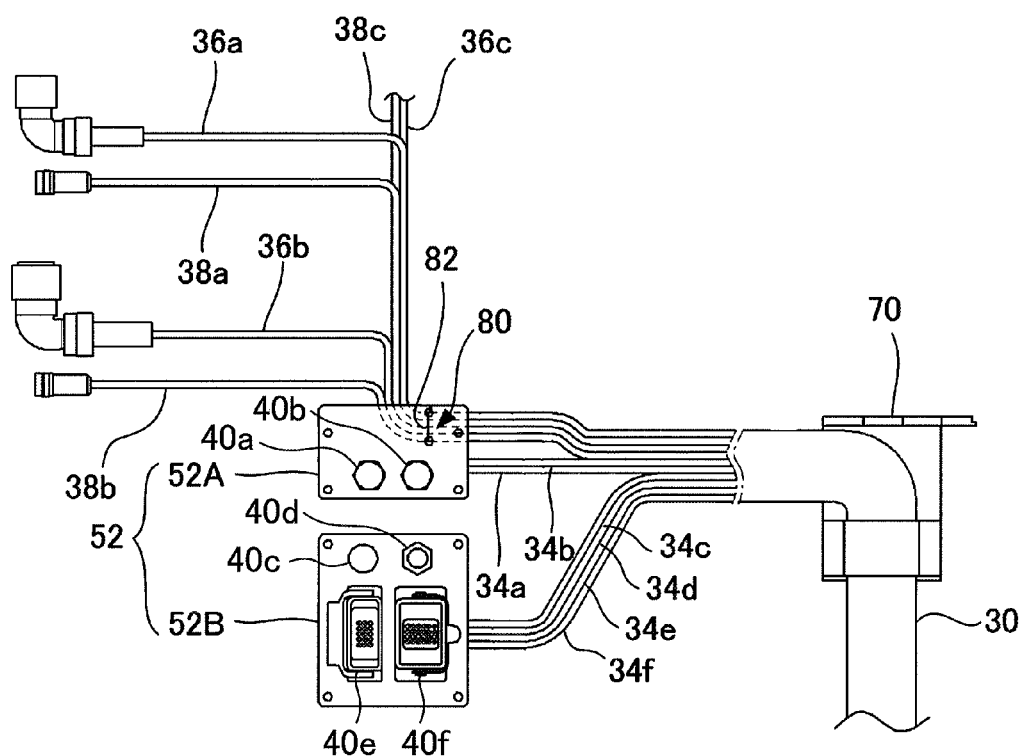
FIG. 5 shows an exemplary arrangement of lines in another embodiment.

FIG. 5 shows an exemplary arrangement of lines in another embodiment. Matters that have already been explained referring to FIGS. 3 and 4 are omitted as necessary. In this embodiment, instead of the second holding member 72 (see FIG. 4), a holding portion 80 capable of holding the power cables 36*a* to 36*c* and the signal cables 38*a* to 38*c* is provided in the first line distribution board element 52A.

The power cables 36*a* to 36*c* and the signal cables 38*a* to 38*c* are held by the holding portion 80 between the first holding member 70 and the end portions of these cables. A position where the cables are held by the holding portion 80 is not particularly limited, provided that it is sufficiently distant from the end portions of the cables.

The configuration of the holding portion 80 is not particularly limited. The holding portion 80 may have any configuration, as long as the holding portion 80 is adapted to prevent the lines from being displaced at the time of operating the robot. For example, as shown in the drawing, the cables may be bound by a band 82. Alternatively, the cables may be sandwiched between plate members facing each other, which are fixed together by screwing.

According to the present embodiment, in which the line distribution board element is provided with the holding portion for holding the power cables and the signal cables connected to the servo motor, it is not necessary to provide a special holding member for holding these cables. Therefore, the cost can be reduced. The cable held by the holding portion may also include an option cable.

Figure 6:
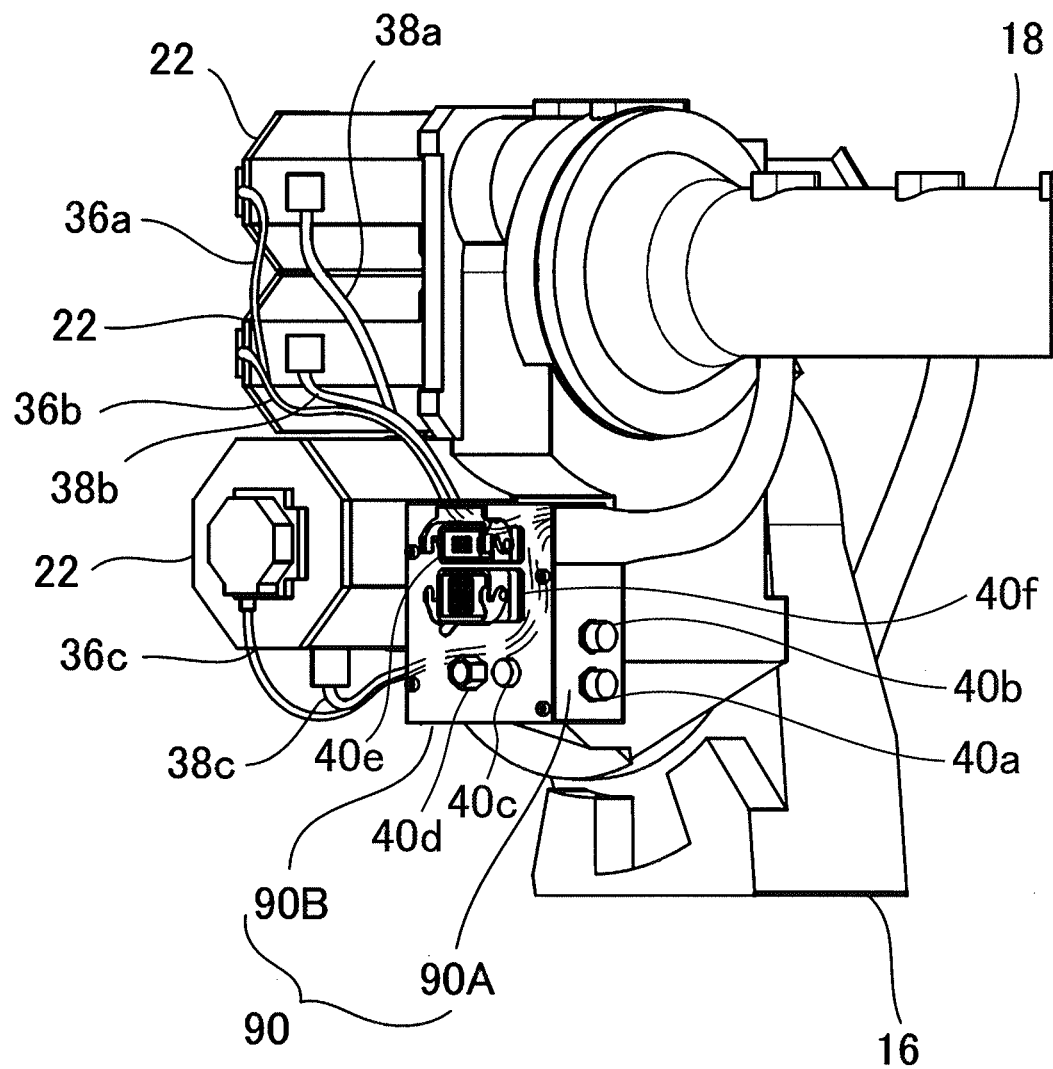
FIG. 6 is a partially enlarged perspective view showing a line distribution board of another embodiment.
Figure 7:
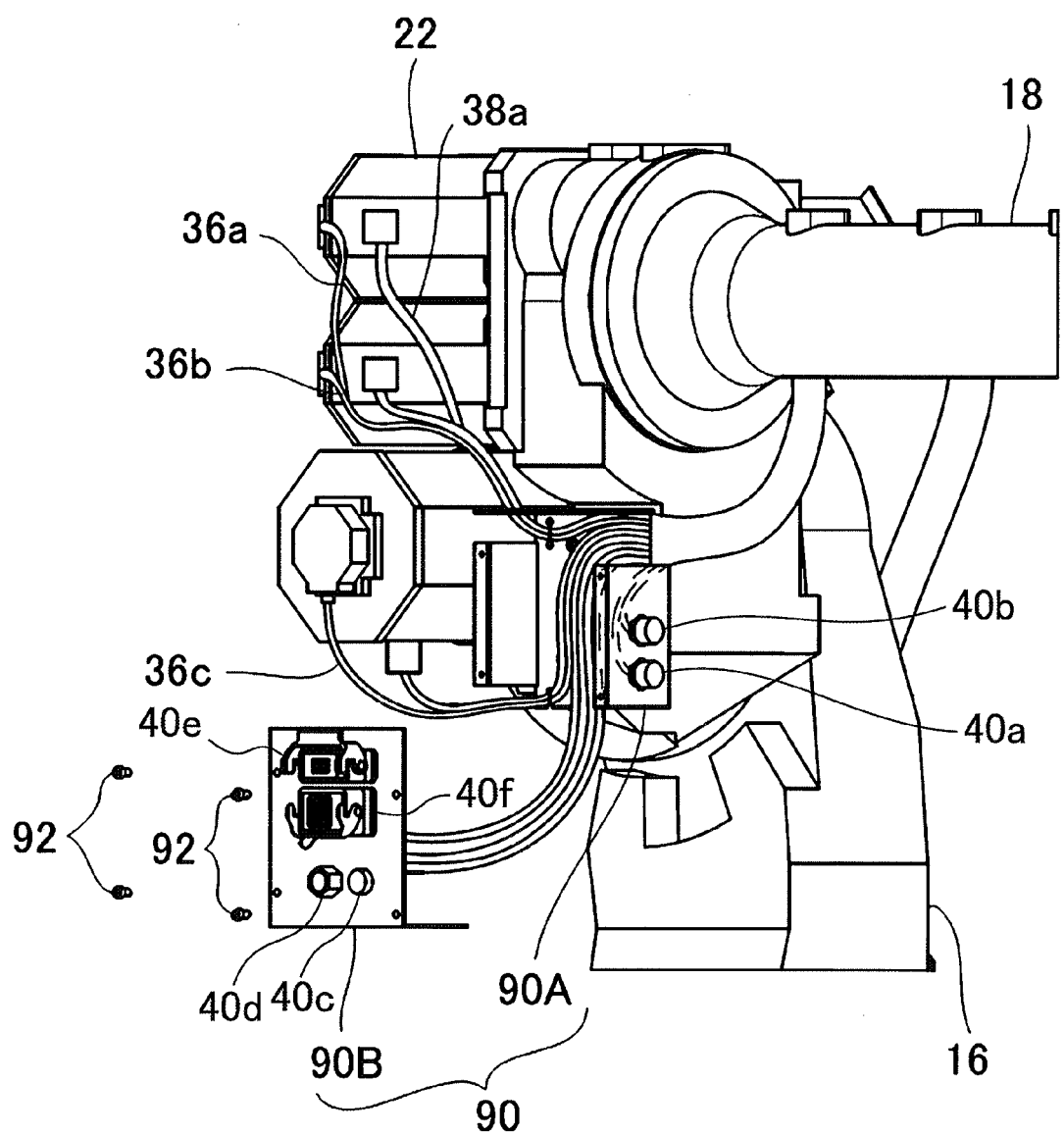
FIG. 7 is a partially exploded view showing the line distribution board of FIG. 6.

FIG. 6 is a partially enlarged perspective view showing a line distribution board 90 of another embodiment. FIG. 7 is a partially exploded view showing the line distribution board 90 of FIG. 6. In the present embodiment, the line distribution board element 90 has a housing shape formed from a first line distribution board element 90A and a second line distribution board 90B assembled with each other. The first line distribution board element 90A is provided with circular connectors 40a and 40b, each of which is attached to end portions of two option cables. The second line distribution board element 90B is provided with circular connectors 40c and 40d and rectangular connectors 40e and 40f, each of which is attached to end portions of four option cables. As can be seen in FIG. 7, the first line distribution board element 90A and the second line distribution board element 90B have supplementary shapes to each other, so as to form a housing of a rectangular parallelepiped shape when assembled together by screws 92.

According to the present embodiment, in which the line distribution board 90 has an outer shape of housing when assembled, foreign objects, such as dust or liquid can be prevented from entering inside the line distribution board 90. This prevents problems, such as damage to the cables or short-circuiting of the cables in the line distribution board 90, from occurring. In addition, by forming the line distribution board elements into the housing, it is possible to reduce unused space, allowing the line distribution board 90 to become compact. As compared to the plate-like distribution board, the line distribution board 90 of a housing shape has larger surface area, thereby providing more space for providing the connectors. Therefore, it is advantageous that the distribution board 90 may be used in the application where different types of option cables and/or the increased number of cables are required.

In the present embodiment, as shown in FIG. 7, the first line distribution board element 90A is attached to the robot 10 and the second line distribution board element 90B is screwed to the first line distribution element 90A. However, the shapes of the line distribution board elements of the line distribution board are not limited to this specific example. Means for assembling the line distribution board elements together is not limited to screwing as illustrated, as long as a sufficiently high sealing effect for preventing foreign objects from entering is achieved. For example, a fastener made of resin may also be used.

Figure 8:
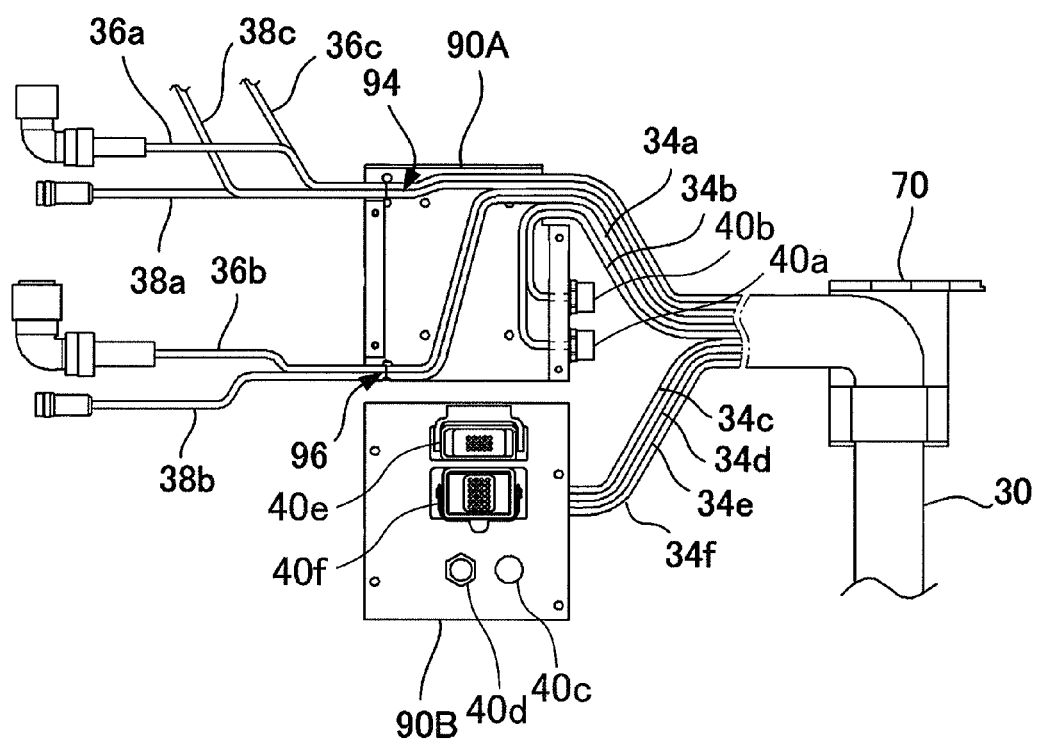
FIG. 8 shows an exemplary arrangement of lines in the embodiment of FIG. 6.

FIG. 8 shows an exemplary arrangement of lines in the embodiment of FIG. 6. The first line distribution board element 90A is provided with two option cables 34a and 34b attached thereto through the circular connectors 40a and 40b, respectively. The second line distribution board element 90B is provided with four option cables 34c to 34f attached thereto through the circular connectors 40c and 40d and the rectangular connectors 40e and 40f. Further, power cables 36a to 36c and the signal cables 38a to 38c, which are connected to the servo motor 22 (see FIG. 6 or 7), are arranged through the first line distribution board element 90A. The power cables 36a to 36c and the signal cables 38a to 38c are held by a first holding portion 94 and a second holding portion 96 provided in the first line distribution board element 90A. Alternatively, a separate holding member for holding the power cables 36a to 36c and the signal cables 38a to 38c may also be provided in a similar way as the embodiment explained referring to FIG. 4.

In the present embodiment, the option cables, which are highly likely and/or frequently subject to replacement, are preferably attached to the second line distribution board element 90B, since the second line distribution board element 90B can be more easily detached than the first line distribution board element 90A. Accordingly, it is advantageous that the wiring of the option cables is implemented in consideration of how easily the respective line distribution board elements can be detached. In order to form the line distribution board of a housing shape, the distribution board may include an additional constituent element, to which no cable is attached.

In the above-described embodiment, the cables are installed as an example of the option cable. However, it goes without saying that the advantageous effect of the present invention can also be achieved in the case of any line, such as a tube or the like for supplying fluid, instead of the cable. Different types of lines combined together at any given ratio may also be used. The structure of the connecting portion of the line attached to the line distribution board element is not to be limited to the illustrated exemplary connector, but may be a union or any other type of connecting means.

The shape of the line distribution board element is not limited to the illustrated example. The line distribution board is not limited to the type in which it is formed from two line distribution board elements as described before. Rather, the line distribution board may be formed from any number of line distribution board elements, i.e., three or more of them. For example, it is advantageous that the lines are divided into several groups according to expected likelihood or frequency of replacement, and the line distribution board elements are provided for each group of the lines. In addition, only one line may be connected to a single line distribution board element. Further, the present invention is not limited to the illustrated embodiment in which two line distribution boards are arranged at different positions, but it is also possible that any number of line distribution boards may be arranged at any given positions in the robot as necessary. Further, the line distribution board according to the present invention may also be used together with a known line distribution board.

EFFECT OF THE INVENTION

With the above configuration according to the present invention, only the line distribution board element of the line distribution board, to which the connecting portion of the line to be replaced is attached, can be separated and selectively replaced. This facilitates a process for replacing the line.

Although various embodiments and variants of the present invention have been explained, it will be apparent for a person skilled in the art that the intended function and effect of the present invention can also be realized by other embodiments and variants. In particular, the constituent elements of the above-described embodiments and variants may be deleted or replaced, or a known means may be added, without departing from the scope and spirit of the present invention. Further, it will be apparent for a person skilled in the art that the present invention can also be implemented in any combination of features of a plurality of embodiments disclosed herein either explicitly or implicitly.

The invention claimed is:

1. A robot comprising:
   a plurality of lines respectively having connecting portions, which are connected to an outer apparatus, at end portions; and
   at least one line distribution board to which the connecting portions of the plurality of lines are attached,
   the line distribution board being attached to at least a base of the robot or a base end portion of an upper arm,
   the line distribution board including a plurality of line distribution board elements, which can be separated from each other, and to which the connecting portion of at least one line of the plurality of lines is attached,
   the line distribution board has a housing formed from the plurality of line distribution board elements when attached to each other,
   the plurality of lines extend inside the housing and up to the connecting portions which are provided on an outer surface of the housing.

2. The robot according to claim 1, further comprising at least one second line which is different from the plurality of lines, wherein the line distribution board includes a holding portion capable of holding the second line at an intermediate portion of the second line.

3. The robot according to claim 2, wherein the second line includes a power line and a signal line connected to a servo motor for driving the robot.

* * * * *